UNITED STATES PATENT OFFICE.

ARTHUR B. LAMB, OF THE UNITED STATES ARMY, AND CHARLES R. HOOVER, OF MIDDLETOWN, CONNECTICUT.

ABSORBENT.

1,321,061.  Specification of Letters Patent.  Patented Nov. 4, 1919.

No Drawing.   Application filed December 28, 1918.   Serial No. 268,750.

*To all whom it may concern:*

Be it known that we, ARTHUR B. LAMB, Lieut. Col., and CHARLES R. HOOVER, civilian, Chemical Warfare Service, U. S. Army, citizens of the United States, and residing at Washington, D. C., and Middletown, Connecticut, respectively, have invented certain new and useful Improvements in Absorbents, of which the following is a specification.

The invention described herein is in the process of preparing new compositions of matter capable of absorbing and oxidizing substantially all of the more readily oxidizable gases and in the compositions produced thereby.

The objects of the invention include the production in a simple, economical, and rapid process, of a material which is efficient, stable, and substantially permanently active, in that after each use of the material as an absorbent, etc., it resumes its original activity and properties upon standing.

Another object is the preparation of such a material as indicated from raw materials cheaply and readily obtained.

Still another object is the preparation of a material which, during its intended use, undergoes a uniform and easily noted color change so that not only is the presence of an oxidizable gas indicated but an approximate estimation of its amount may be made.

The composition is intended primarily for the detection and elimination of small amounts of easily oxidizable gases mixed with air in order that the air may be breathed, but other applications of the material will be readily apparent to those skilled in the art. As examples of gases readily detected and eliminated from air by this material, there may be mentioned carbon monoxid, arsin, phosphin, gaseous or volatile hydro-carbons such as oil vapor or natural gas, industrial gases such as ammonia, sewer gas and various other toxic and nontoxic organic gases and vapors.

In addition to the uses indicated, advantage may be taken of the powerful oxidizing and dehydrating action of the composition for the purpose of decomposing or combining with reducing gases and vapors and organic substances, such as hydrids, nitrids, hydro-carbons, esters, etc. Or it may be used for the partial or complete oxidation of organic or inorganic substances in chemical synthesis and analysis.

The composition of the material varies somewhat according to the purpose for which it is to be used, but only in the proportions of the several constituents. The final product is a mixture or compound, or both, of oxids of iodin, oxids of sulfur, and water. There may be added to this a small amount of iodin and a solid supporting substance, depending upon the use of the product. The solid supporting material may be pumice or asbestos but it should be understood that any suitable material may be used in the place of these.

This new product, for the want of a better name, has been named "hoolamite".

In the preparation of the new product, fuming sulfuric acid and iodic anhydrid are used in proportions varying from a small amount of one in a relatively large amount of the other to a relatively large amount of the first with a small amount of the second. The most advantageous mixtures for most purposes, however, lie in the range of from 3 to 1 of the acid to 1 to 10 of the iodic anhydrid. The particular proportions to be chosen will depend upon the use. For example, in respirators, it is desirable to use a composition having not too great a proportion of fuming sulfuric acid because of the tendency to give off sulfuric anhydrid. For other purposes it may be that a small amount of sulfuric anhydrid in the gas after treatment will not be objectionable and in such cases a greater proportion of the acid may be used with an increase in the sensitiveness of the composition.

A specific example of the preparation of the product on a supporting material and one to be used as an absorbent or oxidizer for respirators, is as follows:

124 parts by weight of pumice, ground to pass through a 10 to 14 mesh sieve and free from moisture and organic matter, are mixed with an equal weight of fuming sulfuric acid containing 28% of free sulfuric anhydrid and stirred until the mixture becomes uniform.

To this mixture is then added 102 parts by weight of finely powdered iodic anhydrid (80 mesh) and the whole well mixed and allowed to stand for three or four days. It is then, if necessary, broken in small fragments which are then ready for use. The whole process should be carried out in closed vessels, so as not to allow undue exposure to moisture, and for this purpose barrel mixers or other tumbling mixers are very well adapted.

A typical mixture to be used chiefly as an indicator may be made by the same process but using about 30 parts of 30 to 40 mesh pumice, about 50 parts of fuming sulfuric acid containing 60% free sulfuric anhydrid, and about 10 parts of iodic anhydrid.

In the processes involving the use of pumice as a carrier it has been found to be an advantage to heat the pumice immediately before mixing, as this allows a better mixing and produces a somewhat better product.

Instead of first mixing the acid and pumice with the subsequent addition of the iodic anhydrid, the latter may be thoroughly mixed dry with the pumice and the fuming sulfuric acid then added and the whole mixed until uniform.

Further, instead of proceeding in the manner indicated in the last paragraph, the iodic anhydrid may be prepared for reaction by saturating the granular or fragmentary carrier with iodic acid in water, evaporating to dryness, and continuing the heating to dehydrate the acid, leaving iodic anhydrid on the carrier. This is then mixed with the fuming sulfuric acid as before indicated.

In case a solid product without a support is desired, about equal parts of iodic anhydrid and fuming sulfuric acid are allowed to interact at a slightly elevated temperature or allowed to stand in contact for a few days until a hard uniform product is obtained. This is then broken in pieces of suitable size and is then ready for use.

A liquid product may be produced by increasing the proportion of fuming sulfuric acid.

The product is a white solid, except in those cases where a large proportion of fuming sulfuric acid has been used and when acting as an oxidizing agent undergoes a color change from white to green to brown. This color change is not permanent but disappears on standing and the material may be repeatedly reused until the iodic oxid has been entirely reduced. It is strongly corrosive and therefore should be kept in containers of glass, porcelain, etc.

In making use of the composition as an absorbent for removing harmful oxidizable gases from air, it should be placed in suitable containers in such fashion as to form a filter for the air which is drawn therethrough. When such a purifier is used in moist air the material should be protected from moisture by drying the air before passing it through the purifying material. This may be accomplished by such drying agents as sulfuric acid, calcium chlorid, etc., in the commonly known manner.

A typical arrangement of materials in a canister intended, for instance, for purifying breathing air supplied to a gas mask, is as follows:

(1) A drier such as has been indicated.
(2) A layer of the herein described absorbent supported on granular pumice.
(3) A cooling device or element to cool the gases heated by the oxidizing absorbent.
(4) A layer of active charcoal to absorb decomposition products arising from the oxidizing action of the new absorbent.
(5) A felt pad to filter out dust, etc.

The various elements are separated from each other by suitable porous screens of wire, etc.

In operation, the air to be purified is drawn through the canister and the several elements in the order named.

On account of the color change which the new composition undergoes upon being used as an oxidizer for oxidizable gases, it may also be used to detect the presence of such gases in the atmosphere or other gas mixtures. The particular composition suitable for this purpose and the method and means whereby such use may be carried out are, however, not being claimed in this application but form the subject matter of a separate application filed concurrently herewith, the said application being filed in the name of the present applicants and having the Serial No. 268,751 and filing date of Dec. 28, 1918.

It is to be understood that the invention is not limited to the specific examples mentioned as the proportions of the constituents and steps of the process may be varied to a degree without departing from the spirit of the invention as set out in the accompanying claims.

Claims:—

1. The process of preparing an oxidizing absorbent material which comprises reacting on iodic anhydrid with sulfuric anhydrid in the presence of a small amount of water.

2. The process of preparing an oxidizing absorbent material which comprises reacting on iodic anhydrid with fuming sulfuric acid.

3. The process of preparing an oxidizing absorbent material which comprises thoroughly mixing iodic anhydrid with fuming sulfuric acid under exclusion of moisture, allowing the mixture to stand until the reaction is complete, and comminuting the product.

4. The process of preparing an oxidizing absorbent material which comprises uniformly mixing fuming sulfuric acid with granulated inert supporting material, adding to the mixture iodic anhydrid, uniformly mixing the whole, allowing the reaction to be completed and suitably comminuting the product.

5. The process of preparing an oxidizing absorbent material which comprises uniformly mixing fuming sulfuric acid with granulated inert supporting material, adding to the mixture iodic anhydrid, and then a small proportion of iodin while uniformly mixing the whole, allowing the reaction to be completed and suitably comminuting the product.

6. The process of preparing an oxidizing absorbent material which comprises uniformly mixing fuming sulfuric acid with granulated pumice as a supporting material, adding to the mixture iodic anhydrid, and uniformly mixing the whole, allowing the reaction to be completed and suitably comminuting the product.

7. The process of preparing an oxidizing absorbent material which comprises uniformly mixing fuming sulfuric acid with hot granulated inert supporting material, adding to the mixture iodic anhydrid and uniformly mixing the whole, allowing the reaction to be completed and suitably comminuting the product.

8. An oxidizing absorbent material comprising a combination of sulfuric anhydrid and iodic anhydrid which material is capable of oxidizing carbon monoxid at ordinary temperatures.

9. An oxidizing absorbent material containing in combination iodic anhydrid, sulfuric anhydrid, and water, which material is a substantially colorless composition capable of oxidizing and absorbing easily oxidizable gases.

10. An oxidizing absorbent material comprising an inert carrier impregnated and coated with a combination of iodic anhydrid, sulfuric anhydrid, and water, which material when acting as an oxidizer changes in color uniformly to green and then to brown.

11. An oxidizing absorbent material comprising an inert support carrying an active oxidizing absorbent resulting from the interaction of iodic anhydrid and fuming sulfuric acid and having a small proportion of iodin added thereto.

12. An active oxidizing material comprising the product resulting from the interaction of iodic anhydrid and fuming sulfuric acid and containing a small proportion of free iodin.

13. An active oxidizing material comprising the product resulting from the interaction of iodic anhydrid and fuming sulfuric acid.

ARTHUR B. LAMB.
CHARLES R. HOOVER.